(No Model.)

D. B. HANSON.
SAW SWAGE.

No. 308,893. Patented Dec. 9, 1884.

Attest:
Edward Stur.
Geo. L. Wheelock

Inventor:
Dempsy B. Hanson
By Knight Bros
Attys.

UNITED STATES PATENT OFFICE.

DEMPSY B. HANSON, OF ST. LOUIS, MISSOURI.

SAW-SWAGE.

SPECIFICATION forming part of Letters Patent No. 308,893, dated December 9, 1884.

Application filed February 20, 1884. (No model.)

*To all whom it may concern:*

Be it known that I, DEMPSY B. HANSON, of the city of St. Louis, in the State of Missouri, have invented a certain new and useful Improvement in Saw-Swages, of which the following is a full, clear, and exact description, reference being had to the accompanying drawings, forming part of this specification, and in which—

Figure 1:
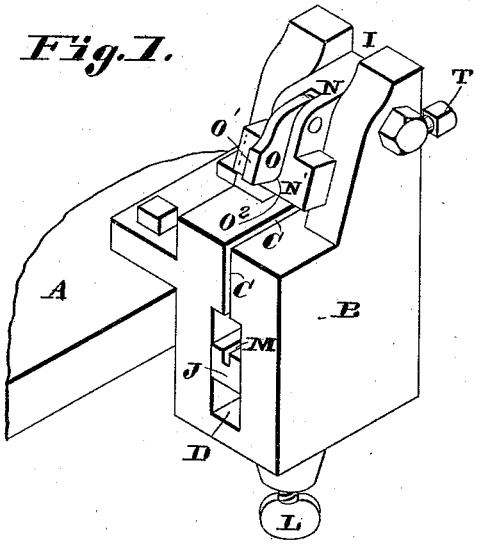
Figure 2:
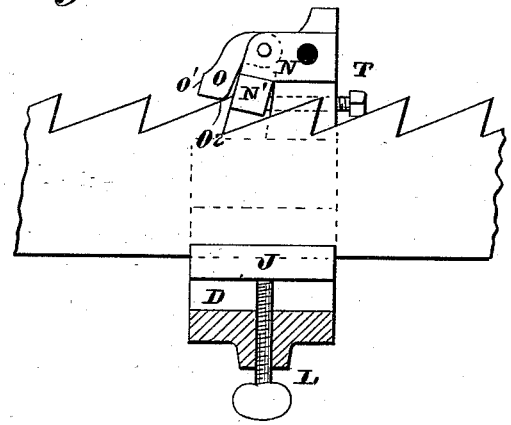
Figure 3:
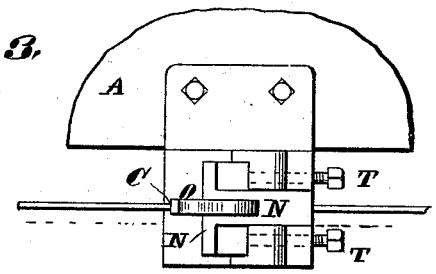

Figure 1 is a perspective view; Fig. 2, a vertical section, and Fig. 3 is a top view.

My invention relates to an improved saw-swage consisting of novel features hereinafter fully described, and pointed out in the claims.

Referring to the drawings, A represents part of a table, bench, or other suitable support, to which is secured a block, B, having a slot, C, a lower opening, D, and an upper opening, I. In the lower opening is preferably a movable holder, J, which can be adjusted by a set-screw, L, passing through the lower end of the block, or by other suitable means. This holder has a groove, M, to receive the back of the saw, and by adjusting it up or down saws with different-width blades can be swaged; but the holder can be dispensed with entirely. In the upper opening, I, is pivoted a dog, N, with a downturned elongated end, N', and to this dog is pivoted the die O, with a suitable surface, O', to be struck by a hammer in swaging. When a tooth is swaged, the saw is pulled or moved forward, sliding on the piece J, the dog sliding over the long incline surface of the tooth until it drops onto the next tooth, and then the saw is pulled back slightly to tighten or press the acute incline of the tooth against the dog, as shown in Fig. 2. The die adjusts itself and is always in place when the saw is forced against the dog, as above described. It has a heel, $O^2$, which bears against the end of the tooth in swaging.

The inclination of the dog may be regulated by set-screws T passing through the back of the block and jamming against the head of the dog.

I claim as my invention—

1. The combination of the slotted block, pivoted dog, and die, arranged and operating substantially as and for the purpose set forth.

2. The combination of the slotted block, holder, pivoted dog, and die, arranged and operating substantially as and for the purpose set forth.

3. The combination of the block, holder, set-screw for adjusting the holder, pivoted dog, pivoted die, and set-screws for adjusting the dog, all substantially as and for the purpose set forth.

DEMPSY B. HANSON.

In presence of—
 GEO. H. KNIGHT,
 BENJ. A. KNIGHT.